(12) United States Patent
Zhao et al.

(10) Patent No.: US 6,726,444 B2
(45) Date of Patent: Apr. 27, 2004

(54) HYBRID HIGH TEMPERATURE ARTICLES AND METHOD OF MAKING

(75) Inventors: Ji-Cheng Zhao, Schenectady, NY (US); Liang Jiang, Schenectady, NY (US); Melvin Robert Jackson, Niskayuna, NY (US); Ramgopal Darolia, Westchester, OH (US); Robert Edward Schafrik, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 86 days.

(21) Appl. No.: 10/063,091

(22) Filed: Mar. 18, 2002

(65) Prior Publication Data

US 2003/0175122 A1 Sep. 18, 2003

(51) Int. Cl.$^7$ .................................................. F01D 5/28
(52) U.S. Cl. ...................................... 415/115; 416/97 R
(58) Field of Search ................................ 415/115, 200; 416/97 R, 96 A, 241 R, 241 B

(56) References Cited

U.S. PATENT DOCUMENTS

| 5,125,793 A | * | 6/1992 | MacArthur et al. | ......... | 415/114 |
| 5,328,331 A | * | 7/1994 | Bunker et al. | ............ | 416/96 R |
| 5,626,462 A | * | 5/1997 | Jackson et al. | ........... | 416/97 R |
| 6,003,754 A | | 12/1999 | Rhodes | | |
| 6,003,756 A | | 12/1999 | Rhodes | | |
| 6,168,871 B1 | * | 1/2001 | Ritter et al. | ................... | 416/95 |
| 6,565,312 B1 | * | 5/2003 | Horn et al. | ................. | 415/115 |

* cited by examiner

Primary Examiner—Edward K. Look
Assistant Examiner—Igor Kershteyn
(74) Attorney, Agent, or Firm—Paul J. DiConza; Patrick K. Patnode

(57) ABSTRACT

An article for use in a hot gas path of a gas turbine assembly, a metallic skin for such an article, and a method for making such an article are presented with, for example, the article comprising a spar, the spar providing mechanical support for the article and comprising a cooling fluid delivery system, a top end, and a bottom end; a standoff structure attached to the spar, the standoff structure comprising a plurality of spacing elements in a spaced-apart relation to each other, the spacing elements having first ends adjacent to the spar and second ends opposite to the first ends; a skin conformally surrounding the spar and the standoff structure, the skin comprising a top end and a bottom end, wherein the standoff structure separates the spar and the skin, wherein the plurality of spacing elements is disposed with an inner surface of the skin adjacent to the second ends of the spacing elements to form a plurality of plena between the spar and the skin, the plena in fluid communication with the cooling fluid delivery system, the skin comprising at least one metal selected from the group consisting of Rh, Pd, and Pt; and a base connecting the bottom end of the spar and the bottom end of the skin.

107 Claims, 3 Drawing Sheets

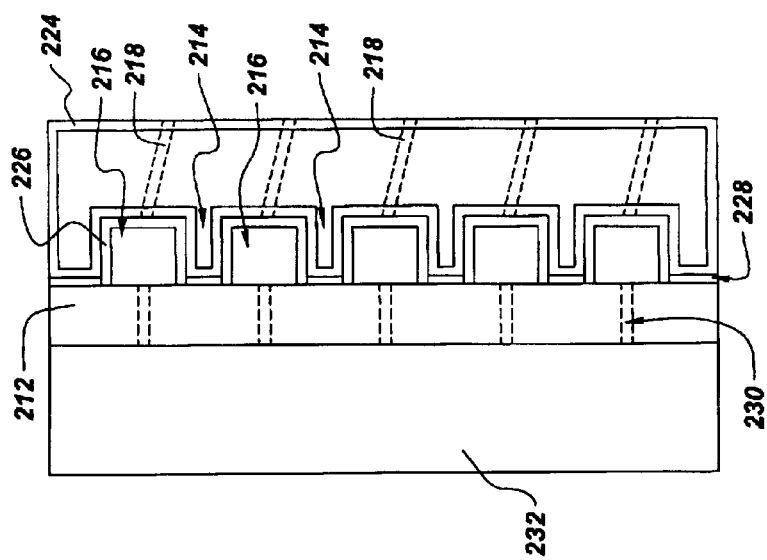
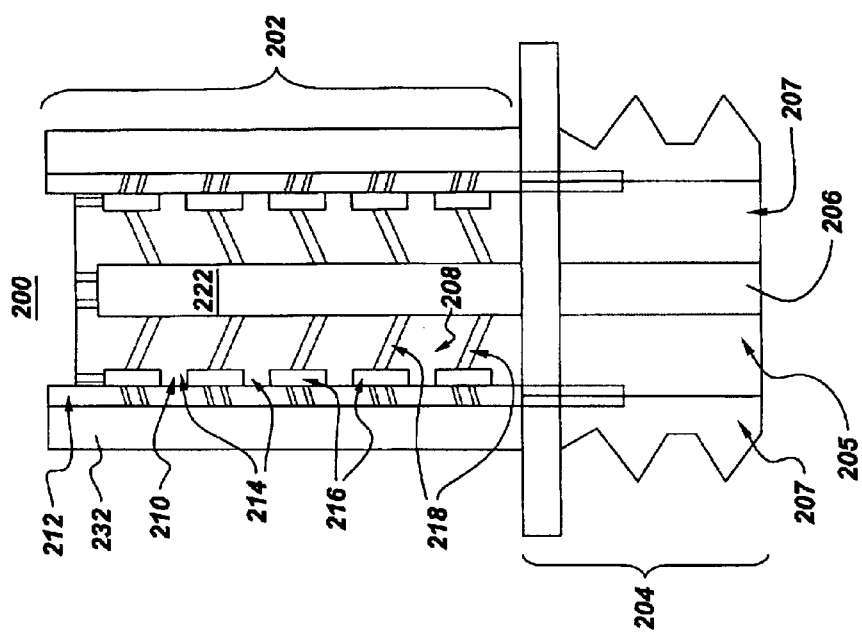

HYBRID HIGH TEMPERATURE ARTICLES AND METHOD OF MAKING

BACKGROUND OF INVENTION

The invention relates to turbine assembly components, such as an airfoil. More particularly, the invention relates to a turbine assembly having a hybrid structure. Even more particularly, the invention relates to articles, such as airfoils, having an oxidation resistant hybrid structure for a turbine assembly.

Turbine assemblies, such as aeronautical turbines, land-based turbines, marine-based turbines, and the like, typically include components formed from a class of materials known as superalloys. Superalloys exhibit desirable chemical and physical properties under the high temperature, high stress, and high-pressure conditions generally encountered during turbine operation. Nickel (Ni), iron (Fe), and cobalt (Co)-base superalloys are of particular interest in such applications. For example, turbine components, such as an airfoil, in modern jet engines can reach temperatures as high as about 1,150° C., which is about 85% of the melting temperatures of most Ni-based superalloys.

At high service temperatures, the superalloys that are used to form the turbine components are highly susceptible to damage from such mechanisms as creep, oxidation, and melting. The application of thermal barrier coatings, typically formed from a refractory material, to the component surface enhances the performance of superalloys at high temperature by reducing the temperature at the metal surface. Although such coatings offer a measure of protection, they are subject to chipping, cracking, and spalling.

The problems associated with material melting points and oxidation resistance are exacerbated by state-of-the-art turbine designs, which call for higher operating temperatures in order to boost turbine efficiency. In advanced design concepts, the surface temperatures of components are expected to exceed the melting points of state-of-the-art superalloys. Therefore, what is needed is a turbine component, such as an airfoil, having improved high-temperature capabilities relating to such parameters as, for example, melting point and oxidation resistance. Due to the often high costs associated with materials exhibiting sufficient high-temperature capabilities, an additional need is for the component to be cost effective.

SUMMARY OF INVENTION

The present invention provides embodiments that address these needs. A first embodiment is an article for use in a hot gas path of a gas turbine assembly. The article comprises: a spar, the spar providing mechanical support for the article and comprising a cooling fluid delivery system, a top end, and a bottom end; a standoff structure attached to the spar, the standoff structure comprising a plurality of spacing elements in a spaced-apart relation to each other, the spacing elements having first ends adjacent to the spar and second ends opposite to the first ends; a skin conformally surrounding the spar and the standoff structure, the skin comprising a top end and a bottom end, wherein the standoff structure separates the spar and the skin, wherein the plurality of spacing elements is disposed with an inner surface of the skin adjacent to the second ends of the spacing elements to form a plurality of plena between the spar and the skin, the plena in fluid communication with the cooling fluid delivery system, the skin comprising at least one metal selected from the group consisting of Rh, Pd, and Pt; and a base connecting the bottom end of the spar and the bottom end of the skin.

A second embodiment is a metallic skin for an article located in the hot gas path of a gas turbine assembly. The skin comprises a free-standing sheet comprising at least one metal selected from the group consisting of Rh, Pd, and Pt; wherein the sheet has a shape adapted to conformally surround a support structure of the article.

A third embodiment is a method for making an article for use in a hot gas path of a gas turbine assembly. The method comprises: providing a spar, the spar providing mechanical support for the article and comprising a cooling fluid delivery system, a top end, and a bottom end; attaching a standoff structure to the spar, the standoff structure comprising a plurality of spacing elements in a spaced-apart relation to each other, the spacing elements having first ends adjacent to the spar and second ends opposite to the first ends; providing a skin conformally surrounding the spar and the standoff structure, the skin comprising a top end and a bottom end, wherein the standoff structure separates the spar and the skin, wherein the plurality of spacing elements is disposed with an inner surface of the skin adjacent to the second ends of the spacing elements to form a plurality of plena between the spar and the skin, the plena in fluid communication with the cooling fluid delivery system, the skin comprising at least one metal selected from the group consisting of Rh, Pd, and Pt; providing a base for the article; and joining the bottom end of the spar and the bottom end of the skin to the base.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 2 is schematic representation of a cross-section of an airfoil of the present invention;

FIG. 3 is an enlarged detail of the airfoil shown in FIG. 2; and

DETAILED DESCRIPTION

In the following description, it is understood that terms such as "top," "bottom," "outward," "inward," and the like are words of convenience and are not to be construed as limiting terms.

Precious metals, such as Rh, Pd, and Pt, and their alloys have high melting temperatures, excellent oxidation resistance, high temperature strength, and good adhesion properties with respect to thermal barrier coatings (also referred to hereinafter as "TBCs"). Due to their very high density and cost, however, it is impractical to fabricate an entire turbine component, such as an airfoil, from such metals and alloys. The present invention overcomes this and other problems by providing a turbine component having a hybrid structure. The hybrid structure comprises at least one spar to provide mechanical support, a standoff structure attached to the spar, and an outer skin comprising at least one precious metal or an alloy thereof. The outer skin is in contact with the standoff structure and conformally surrounds the spar.

Figure 1:
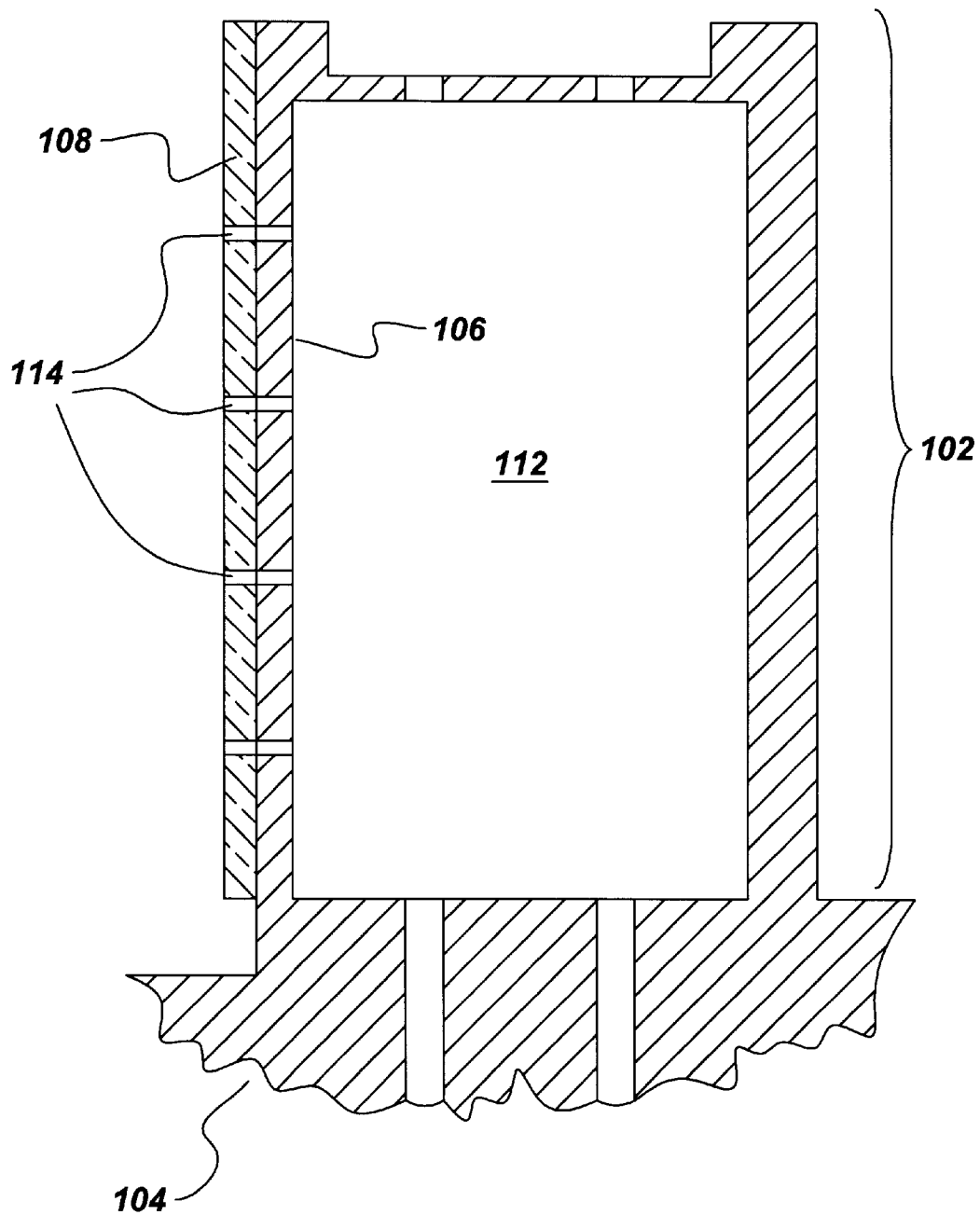
FIG. 1 is schematic representation of a cross-section of an airfoil of the prior art.

Referring to the drawings in general and to FIG. 1 in particular, it will be understood that the illustrations are for the purpose of describing an exemplary embodiment of the invention and are not intended to limit the invention thereto. FIG. 1 is a cross-sectional representation of a turbine blade 100 of the prior art adapted for use in a turbine assembly. Turbine blade 100 comprises an airfoil 102, which extends into a hot gas path within the turbine assembly 100, and a base 104 for attaching turbine blade 100 to a turbine disk (not shown) and the remainder of the turbine assembly. Airfoil 102 is formed by walls 106 comprising a nickel-, iron-, or cobalt-base superalloy. Walls 106 may further include a thermal barrier coating 108 disposed on an outer surface of walls 106 to protect walls 106 and airfoil 102 from oxidation. In order to cool airfoil 102 during operation of the turbine assembly, base 104 is provided with inlets 110 through which a cooling medium passes into the interior of the airfoil 112. The cooling medium then passes through holes 114 in walls 106 to cool the outer surface of walls 106.

During operation of the turbine assembly, thermal barrier coating 108 eventually erodes or spalls away due to exposure to hot gases within the hot gas path of the turbine assembly. Consequently, walls 106 are exposed to the hot gases and corrode prematurely. Turbine blade 100 must then be replaced or refurbished.

A cross-sectional representation of an article of the present invention is shown in FIG. 2. The article shown in FIG. 2 is a turbine blade 200. While the various embodiments of the present invention are described herein as a turbine blade, the articles claimed in the present invention are not limited thereto. Other components of a turbine assembly that are exposed to a hot gas path within a turbine assembly are also considered to be within the scope of the invention. These components include, but are not limited to, combustors, vanes, and the like. As can be seen in FIG. 2, turbine blade 200 comprises an airfoil 202 that extends into the hot gas path of the turbine assembly and a base 204 connecting airfoil 202 to the remainder of the turbine assembly. Base 204 comprises a superalloy, and, in certain embodiments, at least one of a nickel-base superalloy, a cobalt-base superalloy, an iron-base superalloy, and combinations thereof. Base 204 includes at least one inlet 206 for delivering a cooling medium to airfoil 202. The cooling medium may pass through the at least one inlet 206 into the interior 222 of airfoil 202.

Airfoil 202 comprises at least one spar 208 that provides mechanical support for airfoil 202, a standoff structure 210 attached to an outer surface of spar 208, and an outer skin 212 attached to standoff structure 210 and conformally surrounding spar 208 and standoff structure 210. Spar 208 includes a cooling fluid delivery system 218 for providing the cooling medium to an exterior surface of spar 208. Standoff structure 210 comprises a plurality of spacing elements 214 that are in a spaced apart relationship with respect to each other. A first end of each of the plurality of spacing elements 214 contacts the outer surface of spar 208 and a second end of each of the plurality of spacing elements 214 contacts an inner surface of outer skin 212, thus separating spar 208 and outer skin 212. The plurality of spacing elements 214 forms a plurality of plena 216 between spar 208 and outer skin 212. Plena 216 are in fluid communication with cooling fluid delivery system 218, thereby allowing a coolant to be supplied to the inner surface of outer skin 212 for cooling the outer skin 212.

In addition to serving as a point of attachment for turbine blade 200 to the remainder of the turbine assembly, base 204 connects a bottom end of spar 208 to a bottom end of outer skin 212. As used herein, "connects" means attaches whereby loads acting on one section are transferred to another section, and the attaching is accomplished by any of a mechanical joint, a metallurgical joint, and combinations thereof. In certain embodiments, skin 212 is connected to base 204 by disposing skin 212 between at least one base inner piece 205 and at least one base outer piece 207. In other embodiments, skin 212 is connected to base 204 by joining skin 212 between base 204 and spar 208. Any of several methods for forming metallurgical joints to attach skin 212 to base 204 is used in either of these alternative embodiments. Suitable methods include, for example, welding, brazing, and diffusion bonding. In some embodiments, any of these joining methods is also used to connect spar 208 to base 204. In certain embodiments, the selection of materials for spar 208 and base 204 causes difficulties in the formation of a suitable metallurgical joint. For example, where base 204 comprises a superalloy and spar 208 comprises a niobium silicide-based composite, obtaining a suitable metallurgical joint is often difficult. In such embodiments, an example of which is shown in FIG. 4, spar 308 is connected to base 304 by any of several suitable mechanical attachment schemes, wherein base 304 is shaped to physically lock spar 308 into place; suitable mechanical attachment schemes include, for example, a dovetail arrangement and an interference fit.

Figure 4:
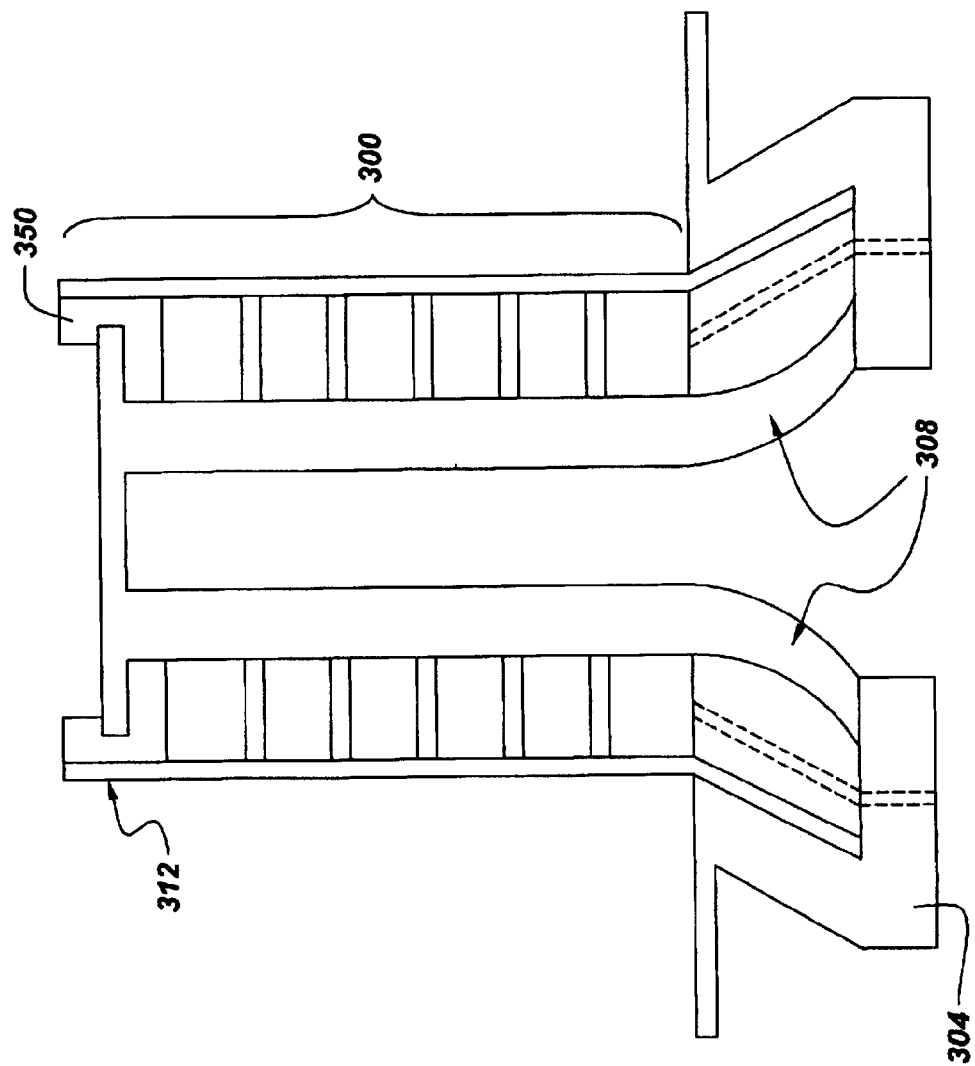
FIG. 4 is a schematic representation of an alternative embodiment of the airfoil of the present invention.

In addition to its attachment at base 304, in some embodiments skin 312 is attached to spar 308 by a retainer 350 (FIG. 4). Retainer 350 provides a secondary point of attachment for skin 312 to spar 308 to provide enhanced mechanical support for skin 312. In the example airfoil embodiment shown in FIG. 4, retainer 350 is located at an opposite end of airfoil 300 from base 304 and is metallurgically joined to skin 312 by any of several suitable techniques, including, for example, welding, brazing, and diffusion bonding. In certain embodiments, a metallurgical joint is also formed between retainer 350 and spar 308. In some embodiments, retainer 350 comprises at least one of platinum, palladium, and rhodium.

Spar 208 (FIG. 2) provides mechanical support for airfoil 202 and, in certain embodiments, comprises at least one of a ceramic, a superalloy, a metal silicide-based composite, and a titanium aluminide. Where spar 208 is formed from a ceramic, the ceramic comprises at least one of a monolithic ceramic (such as silicon nitride) and a ceramic matrix composite (hereinafter referred to as "CMC"). In certain embodiments, the CMC comprises silicon carbide, such as, for example, silicon carbide fibers or particles embedded in a silicon carbide matrix. In another embodiment, spar 208 comprises at least one of a nickel-base superalloy, a cobalt-base superalloy, an iron-base superalloy, and combinations thereof. In certain embodiments, the superalloy comprises a directionally solidified superalloy, such as, for example, a directionally solidified eutectic alloy. In other embodiments, the superalloy comprises a single crystal. In yet another embodiment where spar 208 comprises a metal silicide-based composite, the composite comprises at least one of a molybdenum-base silicide, a niobium-base silicide, and combinations thereof. Spar 208 has a thickness in the range from about 0.5 mm to about 5.0 mm, such as, for example, from about 0.5 mm to about 3.0 mm.

Cooling fluid distribution system 218 of spar 208 delivers coolant through spar 208 to plena 216 to provide cooling for outer skin 212. Suitable cooling fluids include, but are not limited to, gases such as air, nitrogen, argon, and the like. In one embodiment, cooling fluid delivery system 218 comprises a plurality of cooling holes (shown FIGS. 2 and 3) extending from an inner surface of spar 208 through spar 208 to an outer surface of spar 208 and plena 216. In this embodiment, a coolant passes from channels located within the interior 222 of the article (in FIG. 2, airfoil 200) through spar 208 to plena 216. Alternatively, cooling fluid delivery system 218 may comprise a plurality of grooves running from a top end to a bottom end of spar 208, through which the coolant passes.

As shown in FIG. 3, in some embodiments spar 208 further comprises an oxidation resistant coating 224 disposed on spar 208. In certain embodiments, oxidation coating 224 has a thickness of between about 5 and about 50 microns and comprises at least one of a platinum-nickel aluminide, a nickel aluminide, and a MCrAlY alloy wherein M is at least one of nickel, iron, and cobalt. In some embodiments, spar 208 further comprises a thermal barrier coating 226 disposed on the outer surface of spar 208. In some embodiments, thermal barrier coating 226 has a thickness in the range from about 0.05 mm to about 0.2 mm and comprises yttria stabilized zirconia.

Standoff structure 210 separates spar 208 and outer skin 212 and comprises a plurality of spacing elements 214. Standoff structure 210 is often attached to spar 208 by forming standoff structure integrally with spar 208, for example as a single casting. Alternatively, standoff structure 210 is formed separately and joined thereto by at least one of a weld, including electron beam welding, a braze, a diffusion bond, and the like. The materials alternatives suitable for use as standoff structure 210 comprise the same materials as those described above for spar 208; i.e., at least one of a CMC, a superalloy, a metal silicide, and a titanium aluminide. In order to accommodate any mismatch in the thermal expansion coefficients of outer skin 212 and spar 208, in some embodiments spacing elements 214 comprise a gradient in material composition, the gradient extending from the first ends of spacing elements 214 adjacent to spar 208 to the second end adjacent to skin 212. In certain embodiments, standoff structure 210 further comprises a diffusion barrier layer 228 disposed at the second ends of spacing elements 214 between outer skin 212 and standoff structure 210. In particular embodiments, diffusion barrier layer 228 has a thickness in the range from about 5 microns to about 50 microns and, certain embodiments, comprises ruthenium.

Spacing elements 214 are in a spaced apart relationship with respect to each other and in some embodiments comprise at least one of right rectangular prisms and right circular cylinders. The spaced apart relationship forms plena 216 between outer skin 212 and spar 208, into which coolant passes. Alternatively, spacing elements 214 may take the form of cones, truncated cones, or the like. Spacing elements 214 have a height in the range from about 0.2 mm to about 3 mm, and may be either of equal or different height. The materials alternatives suitable for use as spacing elements 214 comprise the same materials as those described above for spar 208; i.e., at least one of a CMC, a superalloy, a metal silicide, and a titanium aluminide.

Outer skin 212 is formed from a material comprising at least one precious metal selected from the group consisting of Rh, Pd, and Pt. In one embodiment, outer skin 212 comprises at least 80 atomic percent precious metal. In another embodiment, outer skin 212 comprises a single piece that conformally surrounds spar 208 and standoff structure, thus forming, for example, the outer surface of airfoil 202. In certain embodiments, skin 212 has a thickness in the range from about 0.1 mm and about 0.5 mm and, in particular embodiments, the thickness is in the range from about 0.1 mm and about 0.3 mm.

In some embodiments of the present invention, skin 212 further comprises a plurality of cooling holes 230 passing through outer skin 212 from an inner surface to an outer surface of outer skin 212. The plurality of cooling holes 230 are in fluid communication with plena 216 and thus allow cooling fluid to pass from plena 216 through outer skin 212 to the outer surface. In certain embodiments, the cooling holes 230 have diameters in the range from about 0.1 mm to about 0.75 mm. Cooling holes 230 may have either the same or different diameters. For example, in one embodiment, the plurality of cooling holes 230 comprises a first group of cooling holes with diameters having a first value, and a second group of cooling holes with diameters having a second value. Such an arrangement allows the amount of cooling fluid directed to any given place to be designed to meet service requirements, which often vary from location to location on a component such as, for example, a turbine airfoil. Alternatively, a similar effect is obtained by other techniques, such as, for example, varying the spacing among holes to concentrate the holes in particular locations as dictated by thermal management needs. In one embodiment, outer skin 212 comprises a single piece that conformally surrounds spar 208 and standoff structure 210, thus forming the outer surface of airfoil 202, and a weld joint, joining one end of outer skin 212 and the inner surface of outer skin 212, forms an enclosure around spar 208. In certain embodiments, skin 212 is joined to standoff structure 210 by at least one metallurgical joint such as, but not limited to, a weld, including electron beam welding, a braze, and a diffusion bond.

Article 200 may further comprise a thermal barrier coating 232 disposed on the outer surface of outer skin 212. Thermal barrier coating 232 comprises yttria stabilized zirconia or any similar material, and in particular embodiments has a columnar microstructure. In some embodiments, thermal barrier coating 232 has a thickness in the range from about 0.1 mm to about 0.5 mm and, in particular embodiments, the thickness is in the range from about 0.1 mm to about 0.3 mm. Thermal barrier coating 232 may be applied to outer skin 212 by any of several suitable methods such as, but not limited to, physical vapor deposition (PVD), plasma spraying, high velocity oxygen flame spraying, or the like. Transpiration cooling of thermal barrier coating 232 may be provided by the plurality of cooling holes 230 in outer skin 212. Airfoil 202 with transpiration cooled thermal barrier coating 232 can be used at much higher temperatures than those airfoils formed entirely from superalloys.

The turbine blade 200 and other turbine component embodiments of the present invention have a higher temperature capability and greater resistance to oxidation than similar articles formed solely from superalloys. The improved high temperature capability and oxidation resistance of the articles of the present invention translate into reduced repair needs, reduced weight, and longer lifetimes for turbine components and turbine assemblies.

Another embodiment of the present invention is a metallic skin 212 for an article 200 located in the hot gas path of a gas turbine assembly. Skin 212 comprises a free-standing sheet comprising at least one metal selected from the group consisting of Rh, Pd, and Pt. The sheet has a shape adapted to conformally surround a support structure 210 of article 200. The term "free-standing" means that, prior to attachment to an article as described above for other embodiments of the present invention, the sheet is not supported by a separate structure, such as, for example, a coating is supported by a substrate. In certain embodiments, the sheet comprises a single piece of metal. Suitable alternatives for the composition, thickness, shape, and other parameters set forth for the skin 212 of the article 200 embodiments described above are also suitable for the skin 212 embodiments.

Another embodiment of the present invention is a method for making the article 200 of the present invention, as described above. Metallurgical joining of the provided elements is accomplished by any of several suitable methods, such as, for example, welding, brazing, and diffusion bonding. Where diffusion bonding is selected to join skin 212 to base 204, the bonding may be done at suitable temperature and pressure to achieve a diffusion bond between skin 212 and base 204. Alternatively, a series of discrete openings may be formed in skin 212 to allow solid-state diffusion of base material from one side of skin 212 to an opposite side through the openings in skin 212, creating a solid bond between the portions of base material separated by skin 212.

While various embodiments are described herein, it will be appreciated from the specification that various combinations of elements, variations, equivalents, or improvements therein may be made by those skilled in the art, and are still within the scope of the invention as defined in the appended claims. For example, turbine assembly components, other than turbine blades, such as combustors, vane, transition pieces, and the like, are considered to lie within the scope of the invention. Additionally, articles that are used in other structures having a hot gas path (e.g., blast furnaces, boilers, and the like) are considered to lie within the scope of the invention. Accordingly, various modifications, adaptations, and alternatives may occur to one skilled in the art without departing from the spirit and scope of the present invention.

What is claimed is:

1. An article for use in a hot gas path of a gas turbine assembly, said article comprising:
    a spar, said spar providing mechanical support for said article and comprising a cooling fluid delivery system, a top end, and a bottom end;
    a standoff structure attached to said spar, said standoff structure comprising a plurality of spacing elements in a spaced-apart relation to each other, said spacing elements having first ends adjacent to said spar and second ends opposite to said first ends;
    a skin conformally surrounding said spar and said standoff structure, said skin comprising a top end and a bottom end, wherein said standoff structure separates said spar and said skin, wherein said plurality of spacing elements is disposed with an inner surface of said skin adjacent to said second ends of said spacing elements to form a plurality of plena between said spar and said skin, said plena in fluid communication with said cooling fluid delivery system, said skin comprising at least one metal selected from the group consisting of Rh, Pd, and Pt; and
    a base connecting said bottom end of said spar and said bottom end of said skin.

2. The article of claim 1, further comprising a thermal barrier coating disposed on said skin.

3. The article of claim 2, wherein said thermal barrier coating comprises yttria-stabilized zirconia.

4. The article of claim 2, wherein said thermal barrier coating comprises a columnar microstructure.

5. The article of claim 2, wherein said thermal barrier coating has a thickness in the range from about 0.1 mm to about 0.5 mm.

6. The article of claim 5, wherein said thickness of said thermal barrier coating is in the range from about 0.1 mm to about 0.3 mm.

7. The article of claim 1, wherein said spar comprises at least one of a ceramic, a superalloy, a silicide-based composite, and a titanium aluminide.

8. The article of claim 7, wherein said composite comprises at least one of a molybdenum-base silicide, a niobium-base silicide, and combinations thereof.

9. The article of claim 7, wherein said ceramic comprises a ceramic matrix composite.

10. The article of claim 9, wherein said composite comprises silicon carbide.

11. The article of claim 7, wherein said superalloy comprises a nickel-based superalloy.

12. The article of claim 11, wherein said nickel-based superalloy comprises a directionally solidified alloy.

13. The article of claim 12, wherein said superalloy comprises a directionally solidified eutectic alloy.

14. The article of claim 11, wherein said nickel-based superalloy comprises a single crystal.

15. The article of claim 1, wherein said spar has a thickness in the range from about 0.5 mm to about 5 mm.

16. The article of claim 15, wherein said thickness of said spar is in the range from about 0.5 mm to about 3 mm.

17. The article of claim 1, wherein said cooling fluid delivery system comprises a plurality of cooling holes.

18. The article of claim 1, wherein said cooling fluid delivery system comprises a plurality of grooves running from said top end to said bottom end of said spar.

19. The article of claim 1, further comprising an oxidation-resistant coating disposed on said spar.

20. The article of claim 19, wherein said oxidation-resistant coating comprises at least one of a platinum-nickel aluminide, a nickel aluminide, and a MCrAlY material, wherein M is at least one of Ni, Fe, and Co.

21. The article of claim 19, wherein said oxidation-resistant coating has a thickness in the range from about 5 to about 50 $\mu$m.

22. The article of claim 1, wherein said spar further comprises an outer surface facing said skin, and wherein a thermal barrier coating is disposed on said outer surface of said spar.

23. The article of claim 22, wherein said thermal barrier coating comprises yttria-stabilized zirconia.

24. The article of claim 22, wherein said thermal barrier coating has a thickness in the range from about 0.05 mm to about 0.2 mm.

25. The article of claim 1, wherein said standoff structure is integral with said spar.

26. The article of claim 1, wherein said spacing elements have a height in the range from about 0.2 to about 3 mm.

27. The article of claim 26, wherein said spacing elements have substantially equal heights.

28. The article of claim 26, wherein said plurality of spacing elements comprises at least one of right rectangular prisms and right circular cylinders.

29. The article of claim 26, wherein said spacing elements are tapered.

30. The article of claim 1, wherein said standoff structure comprises at least one of a ceramic, a superalloy, a silicide-based composite, and a titanium aluminide.

31. The article of claim 30, wherein said ceramic comprises a ceramic matrix composite.

32. The article of claim 31, wherein said composite comprises silicon carbide.

33. The article of claim 30, wherein said superalloy is a nickel-based superalloy.

34. The article of claim 33, wherein said nickel-based superalloy comprises a directionally solidified alloy.

35. The article of claim 34, wherein said superalloy comprises a directionally solidified eutectic alloy.

36. The article of claim 33, wherein said nickel-based superalloy comprises a single crystal.

37. The article of claim 1, wherein said spacing elements comprise a gradient in material composition, said gradient extending from said first ends adjacent to said spar to said second ends adjacent to said skin.

38. The article of claim 1, wherein said standoff structure further comprises a diffusion barrier layer disposed at said second ends of said spacing elements.

39. The article of claim 38, wherein said diffusion barrier layer comprises ruthenium.

40. The article of claim 38, wherein said diffusion barrier layer has a thickness in the range from about 5 to about 50 μm.

41. The article of claim 1, wherein said skin comprises a single piece of said metal.

42. The article of claim 1, wherein said skin comprises at least about 80 atomic percent of said metal.

43. The article of claim 1, wherein said skin has a thickness in the range from about 0.1 mm to about 0.5 mm.

44. The article of claim 43, wherein said thickness of said skin is in the range from about 0.1 to about 0.3 mm.

45. The article of claim 1, wherein said skin further comprises a plurality of cooling holes in fluid communication with said plena.

46. The article of claim 45, wherein said cooling holes of said skin have diameters in the range from about 0.1 mm to about 0.75 mm.

47. The article of claim 45, wherein said plurality of cooling holes comprises a first group of cooling holes with diameters having a first value, and a second group of cooling holes with diameters having a second value.

48. The article of claim 1, wherein said skin further comprises a weld joint joining a first end of said skin to said inner surface of said skin to form an enclosure around said spar.

49. The article of claim 1, wherein said skin further comprises at least one metallurgical joint connecting said skin to said standoff structure.

50. The article of claim 49, wherein said metallurgical joint comprises at least one of a weld joint, a braze joint, and a diffusion bond joint.

51. The article of claim 1, wherein said article comprises a turbine airfoil.

52. The article of claim 51, wherein said base comprises a platform of said airfoil.

53. The article of claim 1, wherein said base comprises a superalloy.

54. The article of claim 53, wherein said superalloy comprises a nickel-based superalloy.

55. The article of claim 1, further comprising a mechanical joint attaching said spar to said base.

56. The article of claim 1, further comprising at least one of a weld joint, a braze joint, and a diffusion bond joint attaching said spar to said base.

57. The article of claim 1, further comprising a retainer interposed between said skin and said spar, wherein said retainer is connected to said skin by at least one of a weld joint, a braze joint, and a diffusion bond joint.

58. A turbine blade for use in a hot gas path of a gas turbine assembly, said turbine blade comprising:
  a spar, said spar providing mechanical support for said airfoil and comprising a plurality of cooling holes;
  a standoff structure integral with said spar, said standoff structure comprising a plurality of spacing elements in a spaced-apart relation to each other, said spacing elements having first ends adjacent to said spar and second ends opposite to said first ends;
  a skin comprising inner and outer surfaces, said skin conformally surrounding said spar and said standoff structure, wherein said standoff structure separates said spar and said skin, wherein said plurality of spacing elements are disposed with said inner surface of said skin adjacent to said second ends of said spacing elements to form a plurality of plena between said spar and said skin, said plena in fluid communication with said cooling holes of said spar, said skin comprising at least 80 atomic percent of a metal selected from the group consisting of Rh, Pd, Pt, and mixtures thereof, said skin further comprising a plurality of cooling holes in fluid communication with said plena;
  a base connecting said spar and said skin; and
  a thermal barrier coating comprising yttria-stabilized zirconia disposed on said outer surface of said skin.

59. A metallic skin for an article located in the hot gas path of a gas turbine assembly, said skin comprising:
  a free-standing sheet comprising, in an amount of at least about 80 atomic percent, at least one metal selected from the group consisting of Rh, Pd, and Pt;
  wherein said sheet has a shape adapted to conformally surround a support structure of said article.

60. The metallic skin of claim 59, wherein said skin comprises a single piece of metal.

61. The metallic skin of claim 59, wherein said skin has a thickness in the range from about 0.1 mm to about 0.5 mm.

62. The metallic skin of claim 61, wherein said thickness of said skin is in the range from about 0.1 to about 0.3 mm.

63. The metallic skin of claim 59, wherein said skin further comprises a plurality of cooling holes.

64. The metallic skin of claim 63, wherein said cooling holes have diameters in the range from about 0.1 mm to about 0.75 mm.

65. The metallic skin of claim 63, wherein said plurality of cooling holes comprises a first group of cooling holes with diameters having a first value, and a second of cooling holes with diameters having a second value.

66. The skin of claim 59, wherein said skin further comprises a weld joint joining a first end of said skin to a surface of said skin to form an enclosure.

67. The skin of claim 59, wherein said shape comprises a turbine airfoil shape.

68. A metallic skin for an airfoil in the hot gas path of a gas turbine assembly, said skin comprising:
  a free-standing sheet comprising, in an amount of at least about 80 atomic percent, at least one metal selected from the group consisting of Rh, Pd, and Pt
  wherein said sheet has a shape adapted to conformally surround a support structure of said airfoil.

69. A method for making an article for use in a hot gas path of a gas turbine assembly, said method comprising:
  providing a spar, said spar providing mechanical support for said article and comprising a cooling fluid delivery system, a top end, and a bottom end;
  attaching a standoff structure to said spar, said standoff structure comprising a plurality of spacing elements in a spaced-apart relation to each other, said spacing elements having first ends adjacent to said spar and second ends opposite to said first ends;
  providing a skin conformally surrounding said spar and said standoff structure, said skin comprising a top end and a bottom end, wherein said standoff structure separates said spar and said skin, wherein said plurality of spacing elements is disposed with an inner surface of said skin adjacent to said second ends of said spacing elements to form a plurality of plena between said spar and said skin, said plena in fluid communication with said cooling fluid delivery system, said skin comprising at least one metal selected from the group consisting of Rh, Pd, and Pt;

providing a base for said article; and joining said bottom end of said spar and said bottom end of said skin to said base.

70. The method of claim 69, further comprising disposing a thermal barrier coating on said skin.

71. The method of claim 70, wherein said thermal barrier coating comprises yttria-stabilized zirconia.

72. The method of claim 70, wherein said thermal barrier coating comprises a columnar microstructure.

73. The method of claim 70, wherein said thermal barrier coating has a thickness in the range from about 0.1 mm to about 0.5 mm.

74. The method of claim 73, wherein said thickness of said thermal barrier coating is in the range from about 0.1 mm to about 0.3 mm.

75. The method of claim 69, wherein providing said spar comprises providing at least one of a ceramic, a superalloy, a silicide-based composite, and a titanium aluminide.

76. The method of claim 75, wherein said ceramic comprises a ceramic matrix composite.

77. The method of claim 75, wherein said superalloy comprises a nickel-based superalloy.

78. The method of claim 77, wherein said nickel-based superalloy comprises one of a directionally solidified alloy and a single-crystal alloy.

79. The method of claim 78, wherein said superalloy comprises a directionally solidified eutectic alloy.

80. The method of claim 69, wherein providing said spar comprises providing a spar having a thickness in the range from about 0.5 mm to about 5 mm.

81. The method of claim 80, wherein said thickness of said spar is in the range from about 0.5 mm to about 3 mm.

82. The method of claim 69, wherein said cooling fluid delivery system of said spar comprises at least one of a plurality of cooling holes and a plurality of grooves running from said top end to said bottom end of said spar.

83. The method of claim 69, further comprising disposing an oxidation-resistant coating on said spar.

84. The method of claim 83, wherein said oxidation-resistant coating comprises at least one of a platinum-nickel aluminide, a nickel aluminide, and a MCrAlY material, wherein M is at least one of Ni, Fe, and Co.

85. The method of claim 83, wherein said oxidation-resistant coating has a thickness in the range from about 5 to about 50 µm.

86. The method of claim 69, further comprising disposing a thermal barrier coating on an outer surface of said spar, wherein said outer surface faces said skin.

87. The method of claim 69, wherein attaching said standoff structure comprises forming said standoff structure integrally with said spar.

88. The method of claim 69, wherein said spacing elements have a height in the range from about 0.2 to about 3 mm.

89. The method of claim 69, wherein said standoff structure comprises at least one of a ceramic, a superalloy, a silicide-based composite, and a titanium aluminide.

90. The method of claim 89, wherein said ceramic comprises a ceramic matrix composite.

91. The method of claim 89, wherein said superalloy comprises a nickel-based superalloy.

92. The method of claim 91, wherein said nickel-based superalloy comprises one of a directionally solidified alloy and a single crystal alloy.

93. The method of claim 91, wherein said superalloy comprises a directionally solidified eutectic alloy.

94. The method of claim 69, further comprising disposing a diffusion barrier layer at said second ends of said spacing elements.

95. The method of claim 69, wherein providing said skin comprises providing a single piece of said metal.

96. The method of claim 69, wherein said skin comprises at least about 80 atomic percent of said metal.

97. The method of claim 69, wherein said skin has a thickness in the range from about 0.1 mm to about 0.5 mm.

98. The method of claim 97, wherein said thickness of said skin is in the range from about 0.1 to about 0.3 mm.

99. The method of claim 69, wherein said skin further comprises a plurality of cooling holes in fluid communication with said plena.

100. The method of claim 99, wherein said cooling holes of said skin have diameters in the range from about 0.1 mm to about 0.75 mm.

101. The method of claim 69, further comprising joining a first end of said skin to said inner surface of said skin to form an enclosure around said spar.

102. The method of claim 69, further comprising forming at least one metallurgical joint connecting said skin to said standoff structure.

103. The method of claim 102, wherein forming comprises at least one of welding, brazing, and diffusion bonding.

104. The method of claim 69, wherein said article made by said method comprises a turbine airfoil.

105. The method of claim 104, wherein providing said base comprises providing a platform of said airfoil.

106. The method of claim 69, wherein joining comprises at least one of welding, brazing, and diffusion bonding.

107. A method for making a turbine blade for use in a hot gas path of a gas turbine assembly, said method comprising:

providing a spar, said spar providing mechanical support for said turbine blade and comprising a plurality of cooling holes, a top end, and a bottom end;

attaching a standoff structure to said spar, said standoff structure comprising a plurality of spacing elements in a spaced-apart relation to each other, said spacing elements having first ends adjacent to said spar and second ends opposite to said first ends;

providing a skin conformally surrounding said spar and said standoff structure, said skin comprising inner and outer surfaces, wherein said standoff structure separates said spar and said skin, wherein said plurality of spacing elements is disposed with said inner surface of said skin adjacent to said second ends of said spacing elements to form a plurality of plena between said spar and said skin, said plena in fluid communication with said cooling holes, said skin further comprising at least 80 atomic percent of a metal selected from the group consisting of Rh, Pd, Pt, and mixtures thereof, said skin further comprising a plurality of cooling holes in fluid communication with said plena;

providing a base for said turbine blade;

joining said bottom end of said spar and said bottom end of said skin to said base; and disposing a thermal barrier coating on said outer surface of said skin.

* * * * *